July 7, 1931.  W. REINHOLD  1,813,545
DEVICE FOR SUPPORTING BEAMS FROM COLUMNS IN
THE CONSTRUCTION OF WELDED BUILDINGS
Filed April 3, 1929
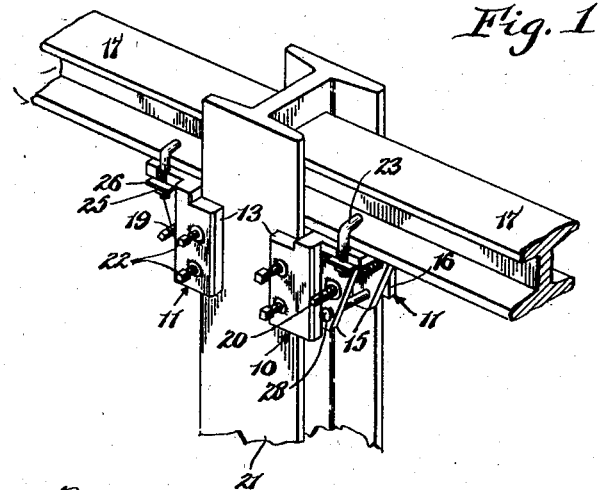
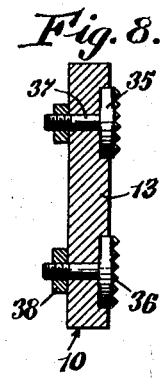
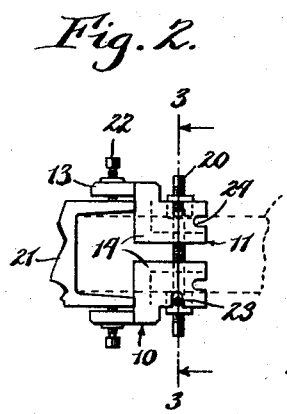
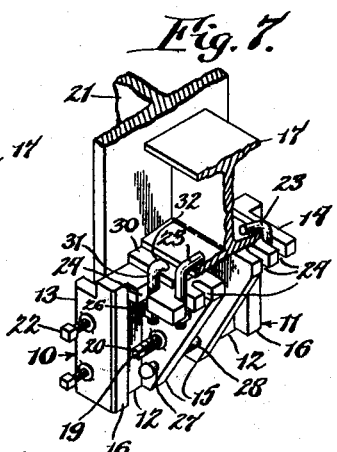
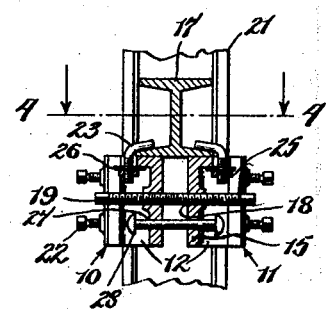
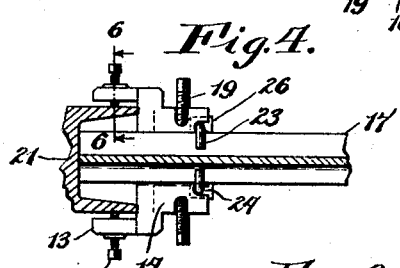
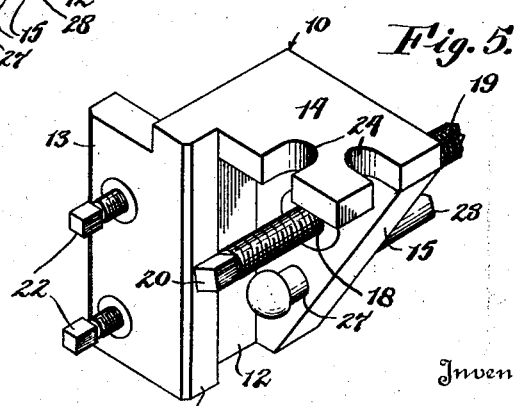
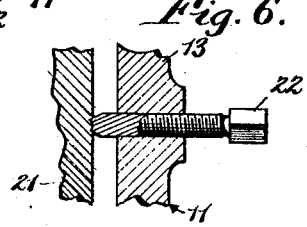
Inventor
William Reinhold
By Poppe & Powers
Attorneys Patented July 7, 1931

1,813,545

UNITED STATES PATENT OFFICE

WILLIAM REINHOLD, OF BUFFALO, NEW YORK

DEVICE FOR SUPPORTING BEAMS FROM COLUMNS IN THE CONSTRUCTION OF WELDED BUILDINGS

Application filed April 3, 1929. Serial No. 352,078.

This invention relates to a temporary support for beams in the construction of a welded building and more particularly to such a support which is adapted to be removably secured to the columns of a building and form a seat for the beams which are positioned thereon, the ends of the beams being thereafter welded to the columns while so positioned by the support embodied in the present invention.

In the production of welded buildings, as heretofore constructed, it has been the practice to rivet supporting plates on the columns before the columns are erected, and on these supporting plates the beams are laid and are welded at their ends to the columns. This procedure, of course, increases the fabrication cost of the structural members of the building to a large extent and if the cost of a welded building is thereby brought within the cost of the riveted building such fabrication of the structural members to be welded must be eliminated. The present invention therefore proposes a temporary support or seat for the beams which is removably secured to the columns and supports the beams while they are being welded to the columns, and after the beams are so welded, can be removed and used in the further construction of the building. By this means the columns employed can be of ordinary rolled stock, cut to the proper length and it is unnecessary to provide any further fabrication of them at the factory to put them in shape for use in the erection of a welded building.

One of the principal objects of this invention is to provide such a removable seat for supporting beams from a column in the construction of a welded building, which support can be quickly applied to the column and when applied will reliably hold the beam in proper position for welding the beam to the column.

A further object is to provide such a support which can be readily removed after the beam has been welded, thereby facilitating the operation of placing the beam in proper position for welding and removing the same after it is no longer necessary.

Still further objects are to provide such a support which is strong and durable, inexpensive in manufacture, and which can be used in connection with columns and beams of varying proportions and which so supports the beams that they can be safely walked upon by the men before the beams are welded.

In the accompanying drawings:

Figure 1 is a perspective view of a column showing my beam supports attached thereto and supporting beams preparatory to welding the beams to the column.

Figure 2 is a fragmentary top plan view of a column showing my support attached thereto, the supported beam being shown in dotted lines.

Figure 3 is a vertical section, taken on line 3—3, Figure 2.

Figure 4 is a horizontal section through the beam and column, the same being taken on line 4—4, Figure 3.

Figure 5 is a perspective view of one of the members of my support.

Figure 6 is a fragmentary vertical section, taken on line 6—6, Figure 4, and showing the manner in which the set screws engage the columns for securely holding the support on the column.

Figure 7 is a perspective view of a portion of a column and a supported beam, showing the beam supported by a modified form of my invention, this form being particularly applicable for use with very large columns and very small beams.

Figure 8 is a sectional view similar to Fig. 6 showing a modified form of means for gripping the column.

In the following description similar characters of reference indicate like parts in the several figures of the drawings.

In its general organization this invention comprises a pair of counterpart members which are adapted to be drawn together by a screw and are formed to engage the opposite sides of the column so as to clamp the column therebetween, each of these members being formed to provide a horizontal seat on which the beam to be welded rests. Set screws are also provided which engage the column so as to insure against slipping of the support and provision is made for the application of hook bolts which engage the flanges of the supported beam and securely hold the same in place while it is being welded to the column.

The support embodying my invention includes two members, 10 and 11 which are of similar form and hence a description of one applies to both. Each of these members includes a vertical part 12 from one end of which a vertical flange 13 projects outwardly. At the upper end of the vertical part 12 each of these members is formed to provide a seat 14 which projects in the opposite direction to the flange 13. This seat is supported on one side by a vertical web 15 and on its opposite side by an extension 16 of the flange 13. The entire member as described is preferably cast integrally and is of sufficient strength to adequately support the end of the beam 17 which it is intended to carry.

The web 15 of each of the members 10 and 11 is provided with a threaded opening 18 in which a screw 19 is arranged. As best shown in Figure 3 this screw is of substantial length and is reversely threaded at its opposite ends. This screw is also squared at its ends as indicated at 20 so that upon the application of a wrench the screw can be conveniently turned. It is apparent that upon turning the screw 19 the two members 10 and 11 will be moved toward and from each other in the same manner as a turn buckle. In applying these members to the column 21 of the building the members 10 and 11 are placed so that the flanges 13 of the members are arranged on opposite sides of the column 21 and upon turning the screw 19 in the proper direction the flanges 13 are brought against the sides of the column so as to clamp the column therebetween and secure the members 10 and 11 thereto.

In order to prevent the members 10 and 11 from turning around the screw 19 when they are free and thereby get out of proper relative position to be applied to a column, each of the members 10 and 11 is provided with a second hole 27 which receives a floating tie rod 28.

This tie rod 28 is provided with heads at its opposite ends so that it cannot become separated from the members 10 and 11 but is free to slide back and forth as the members 10 and 11 are moved toward and from one another upon turning the screw 19. It is apparent that this tie rod, in cooperation with the screw 19 will always hold the members 10 and 11 in proper relative position to be applied and thereby greatly facilitates the application of the device to a column, especially where conditions are hazardous and the device should be applied as speedily as possible.

For the purpose of preventing slipping of the members 10 and 11 on the column the flange 13 of each of the members carries a pair of set screws 22 which set screws are preferably recessed at their inner ends as indicated in Fig. 6 and are adapted to dig into the sides or edges of the flanges of the column 21 and form a positive engagement between the members and the column. By this means after the members 10 and 11 have been clamped to the column as described, the set screws 22 are tightened up so as to dig into the column and positively hold the members 10 and 11 against slipping.

After the members 10 and 11 have been secured to the column 21, as described, the beam 17 is lowered so that its ends rest on the seats 14 formed by these members. In order to prevent accidental derangement of the beam after it has been so placed and also to permit of the beam being safely walked upon by the workmen before the beam is welded to the column, hook bolts 23 are provided which are adapted to form a positive connection between the beam and the supporting members 10 and 11. As best shown in Fig. 5 each of the seats are formed to provide one or more notches or recesses 24 which are adapted to receive the hook bolts 23. The hook bolts 23, as best shown in Fig. 3, are of L-form and are threaded at their lower ends and provided with a nut 25. A plate or washer 26 is also arranged above the nut 25 for the purpose of providing a larger surface to engage the under side of the seat 14 of each member 10 and 11. After the beam has been positioned on the seats 14 of the counterpart members the hook bolts 23 are slipped into the recesses 24 in such manner that their upper ends engage the upper sides of the lower flanges of the supported beam and their washers 26 and nuts 25 are arranged underneath the seats 14 of the supporting members. Upon thereafter tightening the nuts 25 it will be apparent that the hook bolts are drawn downwardly so as to securely clamp the lower flanges of the supported beam to the seats 14 and that therefore the beam is firmly held in position for welding.

By the provision of the two notches 24 in each of the seat portions 14 of each of the members 10 and 11 both wide and narrow beams can be supported by these members. If a beam having a wide flange, such as is shown in Figs. 1, 2 and 3, is to be supported the hook bolts 23 are arranged in the notches 24 at the sides of the seats 14, as shown in these figures. If, however, a narrow beam is to be supported the hook bolts 23 are arranged in the notches 24 at the outer ends of the seats 14, as illustrated in Fig. 4. By these means the members 10 and 11 are adapted to support beams of varying widths, thus eliminating the necessity for providing a number of different sizes of supports to meet different conditions.

After the welding has been finished the hook bolts 23 are loosened and the screw 19 is turned so as to release the counterpart members 10 and 11 from the column 21 and the support can thereafter be used in supporting another beam.

The modified form of the invention illustrated in Fig. 7 is designed to be used where it is necessary to secure a very small beam to a very large column. With extreme conditions of this character it is possible that with the form of the device illustrated in Figs. 1–6 that the members 10 and 11 could not be brought together sufficiently close to properly seat the small beam being supported. This difficulty is eliminated by the provision of a secondary wide seating plate 30 which rests on the members 10 and 11 and is held in place by a pair of hook bolts 31, these hook bolts being arranged in the side recesses 24 and having their hooks entering holes 32 in the auxiliary plate 30. In this form of the invention the members 10 and 11 are preferably provided with a series of notches 24 at the outer ends of the seats so that if the hook bolts 23 are not large enough to reach from the outermost notches 24 to the flange of the supported beam, they can be moved in a notch. It is apparent that by this arrangement, the supported beam can actually be narrower than the space between the members 10 and 11 and since it seats on the auxiliary plate 30 it will be properly supported by and held to the clamping members.

Instead of the setscrews 22, it is apparent that a fixed gripping member may be employed which is drawn against the sides of the column as the members 10 and 11 are drawn together by the screw 19. For this purpose as shown in Fig. 8 a pair of tool steel circular inserts 35 are set into the inner sides of the flanges 13, the inner face of these inserts being cut or indented to provide a plurality of sharp teeth 36. These inserts are provided with threaded extensions 37 which extend through the flanges 13 and the inserts are held in place by nuts 38. It is therefore apparent that as the members 10 and 11 are drawn together, the teeth 36 of the inserts dig into the side of the column and prevent the members 10 and 11 from slipping. By this means the separate operation of tightening the set screws 22 is eliminated.

It is apparent that any of the forms of this invention provide a very simple, inexpensive and quickly applied support, which firmly and reliably supports the end of a structural beam from the column of a building and is particularly applicable in the construction of a welded building in which it it is desirable to use, as far as possible, regular rolled structural members, cut to length, and without further fabrication at the factory or plant. It is also particularly applicable to beams or columns of widely varying relative sizes and particularly in supporting very small beams from very large columns.

I claim as my invention:

1. A device of the character described, comprising a pair of supporting members each formed with a jaw adapted to engage a structural member, and the screw connecting said supporting members, said screw being reversely threaded at its opposite ends whereby upon turning said screw said supporting members are moved toward and from each other to clamp the structural member therebetween, one of said members being formed to support the end of a beam.

2. A device of the character described, comprising a pair of supporting members each formed to provide a vertical part adapted to engage a column, a horizontally extending part adapted to form a seat, and a web arranged below said seat and connecting said horizontally extending part and said vertically extending part, said webs being provided with threaded openings and a horizontal screw in said openings and adapted upon being turned to move said members toward and from each other to clamp the column therebetween, said seats being adapted to jointly support the ends of a beam.

3. A device of the character described, comprising a pair of supporting members each formed to provide a vertical part, a vertical flange extending outwardly from said vertical part, a seat projecting horizontally outward from said vertical part and a web arranged below said seat and connecting said seat and vertical part, each of said webs being provided with a threaded opening, a screw having its ends reversely threaded and arranged in said openings whereby upon turning said screw said members are moved toward and from one another to clamp the column between said vertical flanges, set screws arranged in said flanges and adapted to be screwed into the sides of said column, and means for securing the end of an I-beam jointly supported by said seats comprising hook bolts received in apertures provided in said seats, the hooks of said hook bolts being adapted to extend over the lower flange of the I-beam.

In testimony whereof I hereby affix my signature.

WILLIAM REINHOLD.